US008040949B2

(12) United States Patent
Cosman et al.

(10) Patent No.: US 8,040,949 B2
(45) Date of Patent: Oct. 18, 2011

(54) VIDEO ENCODING METHODS AND DEVICES

(75) Inventors: Pamela Cosman, La Jolla, CA (US); Athanasios Leontaris, La Jolla, CA (US); Vijay Chellapa, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1711 days.

(21) Appl. No.: 10/541,732

(22) PCT Filed: Jan. 9, 2004

(86) PCT No.: PCT/US2004/000446
§ 371 (c)(1),
(2), (4) Date: Sep. 16, 2005

(87) PCT Pub. No.: WO2004/064373
PCT Pub. Date: Jul. 29, 2004

(65) Prior Publication Data
US 2006/0098738 A1    May 11, 2006

Related U.S. Application Data

(60) Provisional application No. 60/438,894, filed on Jan. 9, 2003, provisional application No. 60/517,467, filed on Nov. 5, 2003.

(51) Int. Cl.
*H04B 1/66* (2006.01)
*H04N 7/12* (2006.01)
*H04N 11/02* (2006.01)
*H04N 11/04* (2006.01)

(52) U.S. Cl. ......... 375/240.16; 375/240.12; 375/240.24

(58) Field of Classification Search ............ 375/240, 375/16
See application file for complete search history.

(56) References Cited

U.S. PATENT DOCUMENTS

| | | | |
|---|---|---|---|
| 5,398,079 A * | 3/1995 | Liu et al. | 348/699 |
| 5,638,128 A * | 6/1997 | Hoogenboom et al. | 375/240.15 |
| 5,883,674 A | 3/1999 | Ogura | |
| 5,926,225 A * | 7/1999 | Fukuhara | 348/16 |
| 6,560,284 B1 * | 5/2003 | Girod et al. | 375/240.12 |
| 6,807,231 B1 * | 10/2004 | Wiegand et al. | 375/240.12 |
| 7,253,831 B2 * | 8/2007 | Gu | 348/14.09 |

FOREIGN PATENT DOCUMENTS
EP    1 089 561    4/2001

(Continued)

OTHER PUBLICATIONS

Zhang, Rui "Video Coding with Optimal Inter/Intra Mode Switching for Packet Loss Resilience" IEEE Journal on Selected Areas in Communications, vol. 18 No. 6 Jun. 2000.*

(Continued)

*Primary Examiner* — Jayanti K Patel
*Assistant Examiner* — Jessica Prince
(74) *Attorney, Agent, or Firm* — Greer, Burns & Crain Ltd.

(57) ABSTRACT

A dual, and possibly multiple, frame approach is used by the invention. Embodiments of the invention include making a decision to use a long term reference frame, which is a frame other than an immediate past reference frame, to conduct INTER coding, or to conduct INTRA frame coding. Other embodiments include use of long and short term reference blocks, and make a decision between two types of INTER coding blocks and INTRA coding. In accordance with embodiments of the invention, a long term frame is a high quality frame. The high quality frame may be used as a reference frame under particular conditions.

9 Claims, 6 Drawing Sheets

FOREIGN PATENT DOCUMENTS

| | | |
|---|---|---|
| JP | 9-187015 | 10/1996 |
| JP | 2001-275118 | 3/2000 |
| WO | WO 00/64187 | 10/2000 |
| WO | WO 01/86960 | 11/2001 |

OTHER PUBLICATIONS

Fukuhara, Takahiro "Very Low Bit-Rate Video Coding with Block Partitioning and Adaptive Selection of Two Time-Differential Frame Memories", IEEE transaction on circuits and systems for video technology, vol. 7 No. 1 Feb. 1999.*

Takahiro Fukuhara et al., "Results of Core Experiments P2 & P3", International Organization for Standardization, ISO/IEC JTC1/SC29/WG11, Nov. 1996, pp. 1-19.

Takahiro Fukuhara et al., "Results of Core Experiments P2 & P3 and Proposal of PG-VOP in VM", International Organization for Standardization, ISO/IEC JTC1/SC29/WG11, Jul. 1996, pp. 1-15.

* cited by examiner

Figure 1 : Dual frame motion compensation example

FIG. 3A (PRIOR ART)
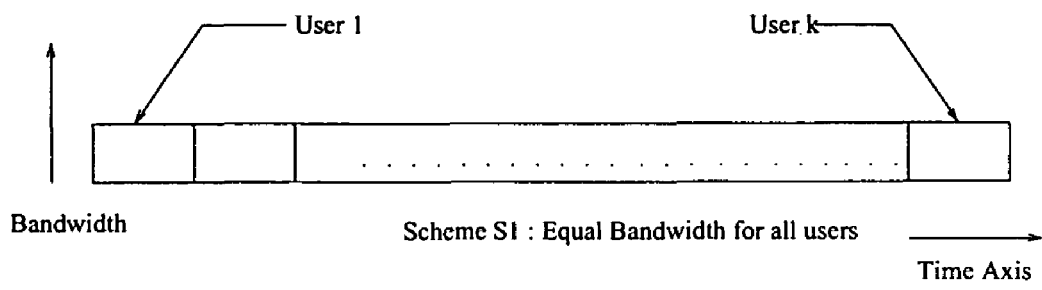
Scheme S1 : Equal Bandwidth for all users
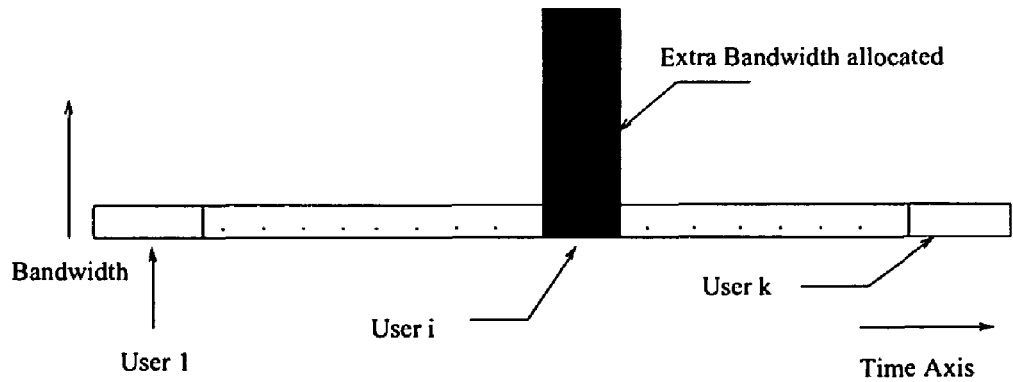
Scheme S2 : Equal Bandwidth for N−1 users, extra bandwidth for user i
FIG. 3B ENCODING METHOD WITH FEEDBACK FOR
PARAMETERS N=2, D=2 and d=5

ENCODING METHOD WITH FEEDBACK FOR
PARAMETERS N=2, D=5 and d=5

VIDEO ENCODING METHODS AND DEVICES

PRIORITY CLAIM

Applicants claim priority benefits under 35 U.S.C. §119 on the basis of Patent Application No. 60/438,894, filed Sep. 9, 2003 and Application No. 60/517,467, filed Nov. 5, 2003.

TECHNICAL FIELD

A field of the invention is image and video coding. Other fields of the invention include digital communications and digital storage of image and video.

BACKGROUND ART

Digital communication and storage of image data is a difficult task due to the sheer volume of digital data required to accurately describe a single frame of an image. In video, the amount of data quickly becomes very large. Image coding seeks to make the communication and/or storage of image data manageable by compressing image data, i.e., reducing the amount of data necessary to represent an image. Communication resources, for example, have limited bandwidth. This is especially true in wireless communication media. There are tradeoffs in image data coding. Reducing the size of the data should not, for example, degrade the image quality beyond an acceptable metric. Also, the computational cost and speed must be managed, especially in devices where computational resources and power resources are to be conserved. Modem examples of video encoding/compression approaches include MPEG-4 and H.264. In particular, the latter has been specifically designed for video transmission over packet networks.

Many devices have access to more than one communication medium. A device, like a laptop, personal digital assistant (PDA), workstation, or a video conferencing system may have access to multiple networks. For example, one device may have access to several different types of wired and wireless networks.

Many video compression algorithms today make use of motion compensation to achieve substantial compression. The basic idea of motion compensation is as follows. A macroblock denotes a block of image data, e.g., a square region of 16 by 16 pixels in an image. A macroblock in the current frame to be encoded is compared against some set of macroblocks in a reference frame to find the one that is the most similar. The reference frame is typically the previous frame in the image. Similarity is usually measured by the sum of the absolute values of the pixel differences, or by the squared difference between pixels. The location of this best match block can be specified by giving an offset vector, called a motion vector, which describes the horizontal and vertical positional difference between the current macroblock to be encoded and the best match macroblock in the reference frame. The current macroblock to be encoded can perhaps be represented only using this motion vector. The decoder, upon receiving this motion vector, can take the referenced block from the reference frame and paste it into place for representing the current block. If the referenced block and the current block are similar enough, this direct substitution might provide adequate quality. If they are not close enough, the encoder can optionally send along some additional information which describes how to modify the referenced block so as to make it more similar to the current block.

In either case, this is referred to as INTER coding. When the encoder finds no good match to the current macroblock, it might choose to encode the current macroblock all by itself, without reference to any other past block. This is referred to as INTRA coding. Choosing between INTER and INTRA coding is the basic approach found in the video coding standards MPEG, MPEG-2, MPEG-4 [T. Sikora, "The MPEG-4 Video Standard Verification Model," IEEE Transactions on Circuits and Systems for Video Technology, vol. 7, no. 1, pp. 19-31, February 1997.], H.263 [G. Cote, B. Erol, M. Gallant and F. Kossentini, "H.263+: Video Coding at Low Bit Rates," IEEE Trans. Circ. and Systems for Video Techn, vol. 8, no. 7, pp. 849-865, November 1998.] and the latest and state-of-the-art H.264.

INTER coding tends to require fewer bits than INTRA coding, but can propagate errors. INTRA coding, since it does not make reference to a previous frame, cannot propagate an error present in a previous frame. Choosing between INTER and INTRA coding involves meeting competing goals of using fewer bits and being robust to errors.

Making an intelligent choice between INTER and INTRA coding is an issue in the art. One paper dealing with this subject is R. Zhang, S. L. Regunathan, and K. Rose, "Video Coding with Optimal Inter/Intra-Mode Switching for Packet Loss Resilience," IEEE Journal on Selected Areas in Communications, vol. 18, no. 6 pp. 966-76, June 2000. This paper provides a distortion estimation method called ROPE (recursive optimal per pixel estimate) which accounts for two factors in estimating the distortion: the channel error probability and the concealability of the block being encoded. The choice between INTER and INTRA coding for a given block (such as a macroblock) is then made by balancing off the competing goals of reducing the distortion (as estimated by ROPE) and using only a small number of bits for encoding (in particular, staying within the target rate constraint). Rate constraints favor INTER coding, error constraints favor INTRA coding, and the ability to conceal errors favors INTER coding.

When a connection used to transmit video data suffers a change in quality, the resulting video decoding may produce very poor results. When the reference frame provides a poor quality reference, the decoding result declines rapidly. One technique to address this that has been proposed is to retain multiple frames. However, this can make the encoding burden and complexity very high.

There are many examples of the multiple reference frame approach. [See, e.g., N. Vasconcelos and A. Lippman, "Library-based Image Coding," IEEE International Conference on Acoustics, Speech, and Signal Processing, vol. v, pp. V/489-V/492, 1994; T. Wiegand, X. Zhang, and B. Girod, "Long term Memory Motion-Compensated Prediction," IEEE Trans. Circ. and Systems for Video Techn., vol. 9, no. 1, pp. 70-84, February 1999.]. In one example, when coding a block in frame N of a video, the encoder might look for the best possible matching block in frames N−1, N−2, N−3, and N−4. That is, the 4 immediate past frames could be searched for a match. The encoder could then tell the decoder which reference frame provided the best match. For example, 2 bits can be assigned to describe which of the 4 frames provides the best match and then the usual motion vector is provided to give the offset between the current block to be encoded and the location of the best match block in the specified reference frame.

In T. Fukuhara, K. Asai, and T. Murakami, "Very Low Bit-Rate Video Coding with Block Partitioning and Adaptive Selection of Two Time-Differential Frame Memories," IEEE Trans. Circ. and Systems for Video Techn., vol. 7, no. 1, pp. 212-220, February 1997, only two time-differential frames were used, thus requiring a relatively modest increase in computational complexity. This dual frame buffer is a special case of multiple frame buffers in which there are only two reference frames. For example, there could be one short term reference frame (the immediate past frame) and one long term reference frame (a frame from the more distant past). In Fukuhara et al., one frame was the previous one, as in many hybrid codecs, and the second one contained a reference frame from the more distant past that was periodically updated according to a predefined rule. It has been shown that multiple reference frames can yield a significant gain in reconstructed PSNR (Peak Signal-to-Noise Ratio, at the expense of increased computational burden and memory complexity. Motion estimation is the main performance bottleneck in a hybrid video coding system, and can account for more than 80-90% of the total encoding time. Thus, adding even one additional frame buffer can double the encoding time. The same is true with memory requirements, where the increase is also linear and thus prohibitive as the number of reference frames grows large.

An always best connected (ABC) approach is an approach used where a device has access to multiple connections. A device such as a laptop or a PDA might be capable of accessing several different types of wireless or wired networks which operate at different rates. For example, the device may be able to communicate using an Ethernet connection (10 Mbps), Wireless LAN (11 Mbps), HDR (400-500 Kbps), 1×RTT (64 kbps), and GPRS (16 kbps). At any given time, the device would operate using the best connection it can access at that particular time provided the user does not choose any other network in his user profile. The best connection would often be the one with highest data rate, but other factors are involved as well (e.g., error rate, delay, etc.). If the best connection becomes unavailable, or it deteriorates to the point where it is no longer the best connection, the device would be expected to switch seamlessly to some other connection, the new best one. Often, this would be a connection at a lower rate. The device would also be expected to probe all connections periodically, to see which ones are available. If a high rate connection becomes unavailable and then becomes available again, the device would be expected to discover the availability, and switch back to using that network.

DISCLOSURE OF INVENTION

A dual, and possibly multiple, frame approach is used by the invention. Embodiments of the invention include making a decision to use a long term reference frame, which is a frame other than an immediate past reference frame, to conduct INTER coding, or to conduct INTRA frame coding. Other embodiments include use of long and short term reference blocks, and making a decision between two types of INTER coding blocks and INTRA coding.

In accordance with embodiments of the invention, a long term frame is a high quality frame. The high quality frame may be used as a reference frame under particular conditions.

BRIEF DESCRIPTION OF DRAWINGS

FIGS. 3A and 3B schematically illustrate two schedulers; the scheduler of FIG. 3B allocates additional bandwidth to users for production of a high quality reference frame.

BEST MODE FOR CARRYING OUT THE INVENTION

Figure 1A:
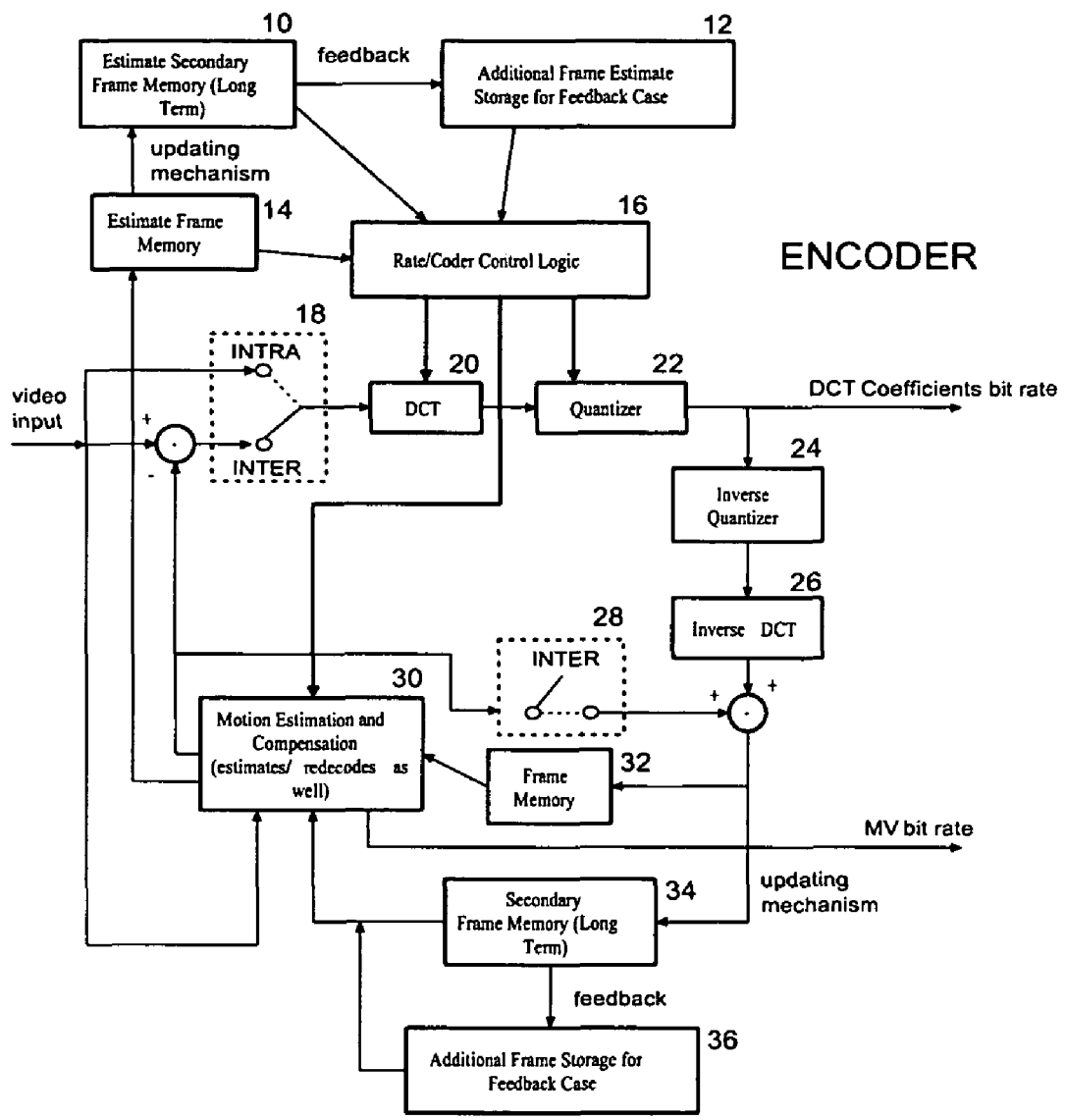
FIGS. 1A and 1B are block diagrams illustrating an exemplary system in accordance with an embodiment of the invention.

The invention is directed to methods, devices and systems for encoding image, e.g. video, data. The invention is also directed to methods, devices and systems for decoding data. The invention will be useful in many types of systems making use of communication media. The invention may be used, for example, in peer-to-peer style communications and in server client style communications, and may also be used, for example to code image data for storage. A particular exemplary embodiment of the invention is a video conferencing system and method. Embodiments of the invention may be particularly suitable to the situation where the video connection can change rate by a significant amount.

In describing embodiments of the invention, the discussion will focus upon handling of frames. This will be the common implementation of the invention. As in the standards, however, processing and comparison is conducted on the basis of blocks. Block sizes are generally arbitrary for purposes of the invention. Common implementations will use macroblocks, as in the above-mentioned standards. As used herein, a frame may be divided into a plurality of blocks, such as macroblocks. However, no particular limitation is placed upon frame size, while embodiments of the invention may make use of the frame sizes in the standards.

The invention may be applied as a modification of many of the above-mentioned standards. The invention may make use of motion compensation vectors as calculated in any of the standards, and may make use of other methods for vector calculation as well. By the invention, known standards are improved, while embodiments of the invention make use of the general standard frameworks and known hardware implementations.

A dual, and possibly multiple, frame approach is used by the invention. Embodiments of the invention include making a decision to use a long term reference frame, which is a frame other than an immediate past reference frame, to conduct INTER coding, or to conduct INTRA frame coding. Other embodiments include use of long and short term reference blocks, and make a decision between two types of INTER coding blocks and INTRA coding. A recursive optimal per pixel estimate (ROPE) is used to compute moments for INTRA coding and the short term reference block, and a modified recursive optimal per pixel estimate is used to compute moments for the long term reference block, where elements of a previous block are treated as random variables.

In accordance with embodiments of the invention, a long term frame is a high quality frame. The high quality frame may be used as a reference frame under particular conditions. The conditions may include a change in the quality of the connection over which video is being received, for example. The high quality frame may, for example, be a past frame from a time of higher quality connection. In another example embodiment a high quality frame or frames are retained in advance of an anticipated change in quality of communication. This may be the result of an advance warning or a prediction of poor quality, or may be conducted periodically, for example, to ensure that a high quality frame is available. For example, a high quality reference frame can occasionally be encoded at the expense of preceding and subsequent frames by starving preceding and subsequent frames of a typical share of allocated bit rate. In additional embodiments, frames are segregated into static and dynamic portions. For example, background and foreground portions may be identified. A high quality reference frame for a background portion may be used for a substantial time period because of its static nature, while a foreground portion is motion compensated by a most recent or recently received frame.

Embodiments of the invention include dual or multiple frame retention embodiments and single reference frame retention embodiments. For example, a dual frame embodiment might compare each block (in the current frame to be encoded) against both a past high quality reference frame and a recent (short term) reference frame, and conduct motion compensation by determining the frame that produces the better result. A past high quality frame is maintained in a long term reference frame buffer and a recent reference frame in a recent reference frame buffer. When a recent reference frame is higher quality than the past reference frame, it is then retained as the past high quality reference frame in the long term reference buffer, and the previous past high quality reference frame is discarded. In an example single frame embodiment, a single reference frame buffer is maintained. A high quality long term reference frame is maintained in the single reference frame buffer until it becomes obsolete, e.g., its similarity to the current frames to be encoded falls below some threshold and a decision is made to begin using immediate past frames as the reference frame.

The encoder complexity in dual or multiple frame embodiments of the invention may be less complex than in the prior art, because a high quality frame is retained as a bench mark. Accordingly, there is not a need to make a large number of comparisons as long as the long term high quality frame is meeting a metric, for example. In addition, the testing of the long term frame compared to recent frames may be conducted sporadically or periodically. The single frame embodiments of the invention provide low complexity encoders, requiring no additional encoder complexity.

A preferred embodiment method of the invention conducts long term motion compensation using data from a past higher rate connection. We consider a situation in which a video coder is transmitting using, for example, an always best connected (ABC) network, and the current best connection deteriorates so the user must switch to a lower rate connection. Consider that the frames from 1 up until N are high quality, because they are transmitted over a high rate channel, and starting with frame N+1, the user now has a low rate connection. With a standard video coder such as MPEG-2 or H.263, the video quality during the time that the low rate connection endures will be lower. Frame N+1 (which must be transmitted at low rate) can use INTER coding from frame N (which had high quality), and so the quality of frame N+1 will benefit from the fact that block matching motion compensation is done using a high quality reference frame. But frame N+1 will be, on average, of lower quality than frame N, since the rate has been cut.

When coding frame N+2, the INTER coding is now done using frame N+1, and so the quality decreases more. One would expect the quality to decrease fairly rapidly until some new steady state is achieved, corresponding to a lower rate, lower quality transmission. In this scenario, embodiments of the invention use a dual frame motion compensation approach, where the long term frame buffer would contain, for example, frame N, the last frame from the high quality, high rate connection, before the good connection failed and a worse connection replaced it. So, for coding frame M, where M>N+1, we would have two frames available for motion compensation: short term frame M−1 (the immediate past frame, of low quality), and long term frame N (a frame of the more distant past, of high quality).

Consider a situation where the scene to be encoded is very static, as with many videoconferencing applications. When the device switches from, say, a Wireless LAN connection at 10 Mbps, down to a GPRS connection at 16 kbps, the background in the scene may remain fairly constant. Using motion compensation from the long term, super-high quality, past, may provide very accurate matches for the current frame. On the other hand, using only the short term past for motion compensation might give poor results, since the 16 kbps is a very low rate and would be producing a low quality video. There are also other reasons that a past high quality frame can provide advantages. Another possible situation where a past high quality frame can provide an advantage can occur with either constant or changing connections. For example, we consider a videoconferencing application where a person or object leaves a scene and then later returns to the scene Using only an immediate past frame as a reference for coding provides no high quality information. In fact, in the very first frame in which they return to the scene, we have no reference information for them at all, high or low quality. If we keep around a high-quality past frame, then we would have high-quality reference information even when they first return to the scene. So this is a case where the high-quality reference frame from the long term past may be useful, even when the scene is not static. This type of advantage might occur also when a person in a videoconferencing situation turns away momentarily, so that their face is not visible for a few frames, and then they turn back around. If we use only the immediate past frame for reference information, then when they turn back around, there would initially be no reference for their face.

Modified and additional embodiments to the use of a past higher rate connection include situations where there is, for example, an advance warning or a prediction of a change in connection quality. Consider the case where a device has some advance warning or is able to predict an impending failure of the current best connection, and of the need for a switch to a low rate connection. Knowing that the decoder can make good use of a particularly high quality frame for the long term frame buffer, the sender can in fact code one frame with particularly high quality before making the switch. That is, by starving the previous and subsequent frames of their usual share of the bit rate, the encoder could, for example, use finer quantization to produce a particularly high quality frame. When the switch is made to the lower rate connection, the decoder could use this particular frame as the long term frame buffer in the dual frame motion compensation.

In another modification, a high quality frame is encoded sporadically or periodically. One reason to do this might be to guard against a change in the quality of connection. In other cases, this might be useful even where there is no concern for a change in the quality of connection. Consider having a single user use (for example) fewer bits for 9 frames in order to give extra bits to the tenth frame (thereby producing a higher quality long term reference frame to be used for the next 10 frames). This can be used to produce higher quality video overall without an increase in the required bandwidth. An additional embodiment includes encoding high quality frames during times of low traffic or when additional bit rate is available. This can also be controlled by a server, for example, allocating bit rates for high quality frames. For example, if a number of users are sharing a bandwidth, a scheduler implemented by a server may cycle a portion of the bandwidth among the users (clients). Each client is periodically allocated a burst of extra bandwidth. The extra bandwidth is used to encode a high-quality frame to be used as a reference frame. Another embodiment concerns clients or peer users to compensate using their own bandwidth allocation, by starving some preceding or subsequent frames of their allocation of bits to create a high quality reference frame.

Embodiments of the invention also may recognize static and dynamic portions of data and adjust encoding based upon such recognition. Suppose we have a situation in which the video to be encoded and transmitted consists of a background portion which is static or nearly so, and a foreground which moves. This can occur, for example, with video telephone and videoconferencing applications. If the current frame to be encoded can be divided into background and foreground regions, then the background (assumed static) can be motion compensated using the high quality frame in the long term past, and the foreground (assumed non-stationary) can be motion compensated using the most recent frame. In addition, there are cases where a dynamic portion of data, such as a foreground, might benefit from a reference to a high quality long term frame. For example, the case in video where an object or person leaves and later returns to a scene presents a case where the dynamic information might benefit from a long term high quality frame or frames.

Additional embodiments of the invention use a single frame long term prediction in combination with any of the aforementioned embodiments or those listed below. Instead of applying a dual frame concept, we use a single frame, the long term past frame with high quality, for motion compensation, until such time as it becomes obsolete (i.e., it is so different from the current frame that we are better off using the immediate past, poor quality frame, for prediction). Unlike the dual frame buffer concept, this does not require any additional complexity at the encoder.

Additional embodiments of the invention relate to decoder concealment. When video signals are compressed and transmitted over unreliable channels, some strategies for handling errors must be employed. One strategy is error concealment, which is a family of post-processing methods that can be employed by the decoder. When a portion of the received frame is corrupted, the decoder's post-processing methods seek to conceal this from the viewer. A variety of alternatives exists: spatial domain interpolation, estimation in the frequency domain, temporal concealment involving locating appropriate blocks in a reference frame. In embodiments of the invention, we assume that the encoder codes according to standard procedure, namely the previous frame is used as the reference frame. However, the decoder can make use of an additional reference frame (the long term past high quality frame) as well as the previous frame. Instead of concealing only when there is a loss, the decoder might use concealment when there is a very poor quality macroblock that is received that could be replaced with a block of higher quality by using the past high quality reference frame. This could be called improvement rather than concealment, but it can be considered a variant on temporal concealment. In essence, when the quality is poor enough, we might choose to consider that a block has been lost even when in fact it hasn't been, and we can invoke a loss concealment approach in which the high quality past frame is used to replace the lost block.

Embodiments of the invention also include various combinations of the above coding decisions and frameworks.

Some particular preferred embodiments will now be discussed in detail, and various additional inventive features will be apparent to artisans.

Figure 1B:
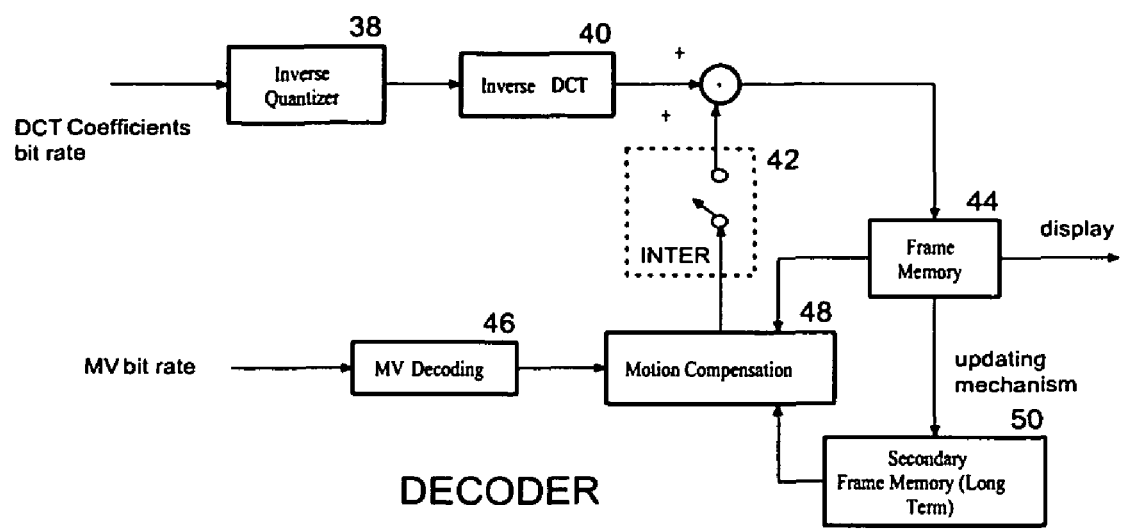

FIGS. 1A and 1B show an example system for implementation of the invention. The system of FIGS. 1A and 1B may employ any of the above embodiments of the invention. FIG. 1A shows an encoder. FIG. 1B shows a decoder. In the encoder, a long-term frame estimate memory 10 stores estimates for long-term frames that are used for mode selection. These estimates are determined by a modified ROPE algorithm. Another memory constituting additional storage 12 may be used to store frame estimates older than those stored in the long-term memory 10. The additional storage 12 is employed in embodiments of the invention where feedback is used. Short term frame estimates are stored in a short term frame estimate memory 14.

Rate/coder control logic 16 uses the frame estimates to calculate distortion and perform rate-distortion optimization. The rate/coder control logic also controls quantization parameter (QP) selection, motion compensation and re-decoding control. A switch 18 is controlled by the rate/coder control logic to send either image pixels (INTRA-coding) or differences of image pixels (INTER-coding) to a discrete cosine transformer (DCT) 20. A quantizer 22 quantizes the image DCT coefficients output by the DCT 20 given a QP that was selected by the rate/coder control logic 16 and outputs a quantization index (coefficient). Given the quantization index, an inverse quantizer 24 reconstructs the image DCT coefficients with use of the QP. An inverse DCT 26 accepts the DCT coefficients (for example an 8×8 block of DCT coefficients) and converts them to image pixels or pixel difference values.

In the case of INTER coding, a switch 28 adds prediction that is obtained with motion compensation from a motion compensator 30. The switch 28 is left open in the case of INTRA coding. The motion compensator 30 performs motion estimation on the current frame, using as predictions, a stored short term frame from a short term frame memory 32 and a stored long-term frame from a long-term frame memory 34. Equivalently, the motion compensator may perform motion compensation using the motion vector obtained in the previous stage. The motion compensator also performs re-decoding as well, for frames for which feedback is available and whose referenced frames have been buffered in a memory 36 that stores additional past re-decoded frames that are used for re-decoding of frames for which feedback is currently available (in feedback embodiments of the invention). The stored estimate in the additional storage 12 is then equal to the re-decoded one, thus, equal to the frame stored in 36. It is shown separately because here it is used for mode selection while in 36 for re-decoding.

At the decoder (FIG. 1B), an inverse quantizer 38 receives quantization indices and reconstructs the DCT coefficients with use of the QP. The inverse quantizer is equivalent in every respect to the inverse quantizer 24 of the encoder. An inverse DCT 40 accepts the DCT coefficients and converts them to image pixels or a difference pixel values. The inverse DCT is equivalent to the inverse DCT 26 of the encoder. A switch 42 adds prediction, or not, and is the equivalent of the switch 28 of the encoder. A short-term frame memory 44 stores the previous reconstructed frame. A motion vector decoder 46 decodes received motion vector and a motion compensator 48 performs motion compensation using a motion vector provided by 46 and the references provided by the short term frame memory 44 and a long-term frame memory 50, which stores a reconstructed long-term frame.

Preferred additional specific methods of the invention will now be discussed, and may also be used in the system FIGS. 1A and 1B or in other systems. A method for encoding video in the system 10 of FIGS. 1A and 1B uses a high quality frame. Video data is divided into frames. The frames may be split into regions, such as background and foreground. This may be useful if the encoder possesses intelligence about the video data. The video data may also be divided into units such as blocks or macroblocks, which makes the encoding calculations simpler. Frames may also be treated as a whole. The encoder determines an expected distortion at the decoder. This may be based upon channel error probability and a history of past coding modes. The encoder uses a high quality past frame to improve a frame being encoded.

The encoder may also recognize a change in data channel quality and store a change in content of the image or image region being encoded. Feedback may be used to store updated versions of expected distortion at the decoder. A determination of which frame buffer will serve as a reference buffer is then made, using the encoder's expectation of distortion at the decoder, the number of frame buffers, the size of frame buffers, any feedback from the decoder, a history of changing data channel quality, and a history of the change in image or region quality to determine both the content of what is stored in the frame buffers and, for each frame or region being encoded (such as a macroblock) of the transmitted image. The determination is made to maximize one of the compression ratio or video quality or some metric balancing both.

Switching between INTER and INTRA coding is a decision implemented in embodiments of the invention. We make use of the recursive optimal per-pixel estimate (ROPE), which provides mode decisions in hybrid video coders operating over packet erasure channels.

We assume that the video bitstream is transmitted over a packet erasure channel. Each frame is partitioned into Groups of Blocks (GOB). Each GOB contains a single horizontal slice of macroblocks (MBs) and is transmitted as a single packet. Each packet can be independently received and decoded, due to resynchronization markers. Thus, a loss of a single packet wipes out one slice of MBs, but keeps the rest of the frame unharmed.

Let p be the probability of packet erasure, which is also the erasure probability for each single pixel. When the erasure is detected by the decoder, error concealment is applied. The decoder replaces the lost macroblock by one from the previous frame, using as motion vector (MV) the median of the MVs of the three closest macroblocks in the GOB above the lost one. If the GOB above has also been lost (or the nearest MBs were all intracoded and therefore have no motion vectors), then the all-zero (0, 0) MV is used, and the lost macroblock is replaced with the co-located one from the previous frame.

Frame n of the original video signal is denoted $f_n$, which is compressed and reconstructed at the encoder as $\hat{f}_n$. The decoded (and possibly error-concealed) reconstruction of frame n at the receiver is denoted by $\tilde{f}_n$. The encoder does not know $\tilde{f}_n$, and treats it as a random variable.

Let $f_n^i$ denote the original value of pixel i in frame n, and let $\hat{f}_n^i$ denote its encoder reconstruction. The reconstructed value at the decoder, possibly after error concealment, is denoted by $\tilde{f}_n^i$. The expected distortion for pixel i is:

$$d_n^i = E\{(f_n^i - \tilde{f}_n^i)^2\} = (f_n^i)^2 - 2f_n^i E\{\tilde{f}_n^i\} + E\{(\tilde{f}_n^i)^2\} \tag{1}$$

Calculation of $d_n^i$ requires the first and second moments of the random variable of the estimated image sequence $\tilde{f}_n^i$. To compute these, recursion functions are developed in ROPE, in which it is necessary to separate out the cases of intra- and inter-coded MBs.

For an intra-coded MB, $\tilde{f}_n^i = \hat{f}_n^i$ with probability 1−p, corresponding to correct receipt of the packet. If the packet is lost, but the previous GOB is correct, the concealment based on the median motion vector leads the decoder to associate pixel i in the current frame with pixel k in the previous frame. Thus, $\tilde{f}_n^i = \tilde{f}_{n-1}^k$ with probability p(1−p). Finally, if both current and previous GOB-packets are lost, $\tilde{f}_n^i = \tilde{f}_{n-1}^i$ (occurs with probability $p^2$). So the two moments for a pixel in an intra-coded MB are:

$$E\{\tilde{f}_n^i\} = (1-p)(\hat{f}_n^i) + p(1-p)E\{\tilde{f}_{n-1}^k\} + p^2 E\{\tilde{f}_{n-1}^i\} \tag{2}$$

$$E\{(\tilde{f}_n^i)2\} = (1-p)(\hat{f}_n^i)^2 + p(1-p)E\{(\tilde{f}_{n-1}^k)^2\} + p^2 E\{(\tilde{f}_{n-1}^i)^2\} \tag{3}$$

For an inter-coded MB, let us assume that its true motion vector is such that pixel i is predicted from pixel j in the previous frame. Thus, the encoder prediction of this pixel is $\hat{f}_{n-1}^j$. The prediction error, $e_n^i$, is compressed, and the quantized residue is $\hat{e}_n^i$. The encoder reconstruction is:

$$\hat{f}_n^i = \hat{f}_{n-1}^j + \hat{e}_n^i \tag{4}$$

The encoder transmits $\hat{e}_n^i$ and the MB's motion vector. If the packet is correctly received, the decoder knows $\hat{e}_n^i$ and the MV, but must still use its own reconstruction of pixel j in the previous frame, $\tilde{f}_{n-1}^j$, which may differ from the encoder value $\hat{f}_{n-1}^j$. Thus, the decoder reconstruction of pixel i is given by:

$$\tilde{f}_n^i = \tilde{f}_{n-1}^j + \hat{e}_n^i \tag{5}$$

Again, the encoder models $\tilde{f}_{n-1}^j$ as a random variable. The derivation of the moments is similar to the intra-coded MB for the last two cases, but differs for the first case where there is no transmission error (probability 1−p). The first and second moment of $\tilde{f}_n^i$ for a pixel in an inter-coded MB is then given by:

$$E\{\tilde{f}_n^i\} = (1-p)(\hat{e}_n^i + E\{\tilde{f}_{n-1}^j\}) + p(1-p)E\{\tilde{f}_{n-1}^k\} + p^2 E\{\tilde{f}_{n-1}^i\} \tag{6}$$

$$E\{(\tilde{f}_n^i)^2\} = (1-p)((\hat{e}_n^i)^2 + 2\hat{e}_n^i E\{\tilde{f}_{n-1}^j\} + E\{(\tilde{f}_{n-1}^j)^2\}) + p(1-p)E\{(\tilde{f}_{n-1}^k)^2\} + p^2 E\{(\tilde{f}_{n-1}^i)^2\} \tag{7}$$

These recursions are performed at the encoder in order to calculate the expected distortion at the decoder. The encoder can exploit this result in its encoding decisions, to optimally choose the coding mode for each MB.

ROPE takes into account the expected distortion due to both compression and transmission errors for optimal mode switching. The encoder switches between intra- or inter-coding on a macroblock basis, in an optimal fashion for a given bit rate and packet loss rate. The goal is to minimize the total distortion D subject to a bit rate constraint R. Using a Lagrange multiplier λ, the ROPE algorithm minimizes the total cost J=D+λR. Individual MB contributions to this cost are additive, thus it can be minimized on a macroblock basis.

Therefore, the encoding mode for each MB is chosen by minimizing $$\min_{mode} J_{MB} = \min_{mode}(D_{MB} + \lambda R_{MB}) \qquad (8)$$

where the distortion $D_{MB}$ of the MB is the sum of the distortion contributions of the individual pixels. Rate control is achieved by modifying λ as in J. Choi and D. Park, "A Stable Feedback Control of the Butter State Using the Controlled Lagrange Multiplier Method", IEEE Trans. Image Proc., vol. 3, pp. 546-58, September, 1994.

Embodiments of the invention use a dual frame buffer together with optimal mode switching within a rate-distortion framework. The basic use of the dual frame buffer is as follows. While encoding frame n, the encoder and decoder both maintain two reference frames in memory. The short-term reference frame is frame n−1. The long-term reference frame is, say, frame n−k, where k may be variable, but is always greater than 1. We now describe how the long term reference frame is chosen.

In one approach, which we call jump updating, the long term reference frame varies from as recent as frame n−2 to as old as frame n−N−1. When encoding frame n, if the long-term reference frame is n−N−1, then, when the encoder moves on to encoding frame n+1, the short-term reference frame will slide forward by one to frame n, and the long-term reference frame will jump forward by N to frame n−1. The long-term reference frame will then remain static for N frames, and then jump forward again. We refer to N as the jump update parameter.

Another approach is to continuously update the long-term frame buffer so that it contains a frame with a fixed temporal distance from the current buffer. Therefore, the buffer always contains the n-D frame for each frame n. We refer to D as the continuous update parameter.

We note that both jump updating and continuous updating can be viewed as special cases of a more general (N,D) updating strategy, in which the long term reference frame jumps forward by an amount N to be the frame at a distance D back from the current frame to be encoded, and then remains static for N frames, and jumps forward again. For general (N,D) updating, a frame k might have an LT frame as recent as frame k−D or as old as frame k−N−D+1. In our definition of jump updating, N can be selected freely for each sequence, and D=2, (meaning that when updating occurs, the LT frame jumps forward by N to become frame n−2). In continuous updating, D can be selected freely for each sequence and N is fixed at 1. The most general updating strategy would have no fixed N or D; rather the long term frame buffer would be updated irregularly when needed, to whatever frame is most useful. In another case, (N,D) remain fixed while coding one sequence. We now describe how the choice is made among the coding modes.

Each macroblock can be encoded in one of three coding modes: intra-coding, inter-coding using the short term buffer (inter-ST-coding), and inter-coding using the long term buffer (inter-LT-coding). The choice among these three will be made using a modified ROPE algorithm. Once the coding mode is chosen, the syntax for encoding the bit stream is almost identical to the standard case of the single frame buffer. The only modification is that, if inter-coding is chosen, a single bit will be sent to indicate use of the short term or long term frame.

We now describe how the choice is made among the coding modes. As before, we use $f_n$, $\hat{f}_n$, and $\tilde{f}_n$ to denote the original frame n, the encoder reconstruction of the compressed frame, and the decoder version of the frame, respectively. We assume that the long term frame buffer was updated m frames ago. Thus, it contains $\hat{f}_{n-m}$ at the transmitter and $\tilde{f}_{n-m}$ at the receiver. The expected distortion for pixel i in frame n is given by Equation 1.

To compute the moments in Equation 1, the recursion steps for pixels in intra-coded and inter-ST-coded MBs are identical to the corresponding steps in the conventional ROPE algorithm. For a pixel in an inter-LT-coded MB, we assume that the true motion vector of the MB is such that pixel i in frame n is predicted from pixel j in frame n−m, where m>1. The encoder prediction of this pixel is $\hat{f}_{n-m}{}^j$. The prediction error $e_n{}^i$ is compressed, and the quantized residue is denoted by $\hat{e}_n{}^i$. The encoder reconstruction of the pixel is:

$$\hat{f}_n{}^i = \hat{e}_n{}^i + \hat{f}_{n-m}{}^j \qquad (9)$$

As the receiver does not have access to $\hat{f}_{n-m}{}^j$, it uses $\tilde{f}_{n-m}{}^j$:

$$\tilde{f}_n{}^i = \hat{e}_n{}^i + \tilde{f}_{n-m}{}^j \qquad (10)$$

When the MB is lost, the median motion vector from the three nearest MBs is calculated and used to associate pixel i in the current frame with pixel k in the previous frame. Using the same arguments as in the original ROPE algorithm, we compute the first and second moments of $\tilde{f}_n{}^i$ for a pixel in an inter-LT-coded MB, $$E\{\tilde{f}_n^i\} = (1-p)(\hat{e}_n^i + E\{\tilde{f}_{n-m}^j\}) + p(1-p)E\{\tilde{f}_{n-1}^k\} + p^2 E\{\tilde{f}_{n-1}^i\} \qquad (11)$$

$$E\{(\tilde{f}_n^i)^2\} = (1-p)\left((\hat{e}_n^i)^2 + 2\hat{e}_n^i E\{\tilde{f}_{n-m}^j\} + E\{(\tilde{f}_{n-m}^j)^2\}\right) + \\ p(1-p)E\{(\tilde{f}_{n-1}^k)^2\} + p^2 E\{(\tilde{f}_{n-1}^i)^2\} \qquad (12)$$

We note that error concealment is still done using the previous frame n−1 and not the long term frame. This is done regardless of whether the three MBs above are inter-ST-coded or inter-LT-coded, or some combination of the two. The motion vectors may be highly uncorrelated. If the upper GOB is also lost, then we conceal the MB using the co-located block from the previous frame.

The presence of neighboring uncorrelated motion vectors negatively affects motion vector coding efficiency. There is a bit rate loss due to inaccurate prediction of motion vectors from their neighboring motion vectors. Furthermore, compression efficiency is reduced because we use one bit for every inter-coded MB, to specify the frame buffer. Nonetheless, experimental results have shown that the rate-distortion optimization models these additional bits, and is still able to yield superior compression performance.

Another modification of conventional ROPE involves extending the benefits of half-pel motion vectors (or other fractional pixel motion vectors), but avoiding a fully accurate half-pel modeling or other fractional modeling since it creates too high a penalty in ROPE. We assume that error concealment (EC) is still done using only the integer portion of the motion vectors, and therefore Equations 2 and 3 for the intra-coded MBs are unchanged. Returning to Equations 6 and 7 for the inter-coded MBs, we see the terms $\hat{e}_n{}^i$, $E\{\tilde{f}_{n-1}{}^k\}$, $E\{\tilde{f}_{n-1}{}^i\}$, $E\{(\tilde{f}_{n-1}{}^k)^2\}$ and $E\{(\tilde{f}_{n-1}{}^i)^2\}$ remain unchanged. However, the calculation of $E\{\tilde{f}_{n-1}{}^j\}$ and $E\{(\tilde{f}_{n-1}{}^j)^2\}$ has become critical. Pixel coordinate j now points to a position in an interpolated grid that covers an area four times that of the original image.

For this calculation, we differentiate among three types of pixels on the half-pel grid: pixels that coincide with actual (original) pixel positions (called integer-indexed pixels, they do not need to be interpolated), pixels that lie between two integer-indexed pixels (either horizontally or vertically), and pixels that lie diagonally between four integer-indexed pixels. We use bilinear interpolation, so the interpolated value is simply the average of the two or four neighboring integer-indexed pixels. For the integer-indexed pixels, the recursion equations are identical to those of the conventional ROPE algorithm, and the estimation is optimal.

For a horizontally or vertically interpolated pixel, we assume that j on the interpolated pixel domain corresponds to a pixel that was interpolated using pixels $k_1$ and $k_2$ in the original pixel domain. The first moment is computationally tractable:

$$E\{\tilde{f}_{n-1}^j\} = \frac{1}{2}[1 + E\{\tilde{f}_{n-1}^{k_1}\} + E\{\tilde{f}_{n-1}^{k_2}\}] \quad (13)$$

But the expression for the second moment is:

$$E\{(\tilde{f}_{n-1}^j)^2\} = \frac{1}{4}[1 + E\{(\tilde{f}_{n-1}^{k_1})\} + E\{(\tilde{f}_{n-1}^{k_2})^2\} + 2E\{\tilde{f}_{n-1}^{k_1}\} + 2E\{\tilde{f}_{n-1}^{k_2}\} + 2E\{\tilde{f}_{n-1}^{k_1}\tilde{f}_{n-1}^{k_2}\}] \quad (14)$$

The last term requires calculating the correlation of matrices whose horizontal/vertical dimension equals the number of pixels in the image. This may be conducted on images of small size, or with sufficient computational resources. However, this is computationally infeasible for images of typical size with use of typical computation resources. It is preferably approximated using the cosine inequality:

$$E\{(\tilde{f}_{n-1}^j)^2\} \le \frac{1}{4}\Big[1 + E\{(\tilde{f}_{n-1}^{k_1})^2\} + E\{(\tilde{f}_{n-1}^{k_2})^2\} + 2E\{\tilde{f}_{n-1}^{k_1}\} + 2E\{\tilde{f}_{n-1}^{k_2}\} + 2\sqrt{E\{(\tilde{f}_{n-1}^{k_1})^2\}E\{(\tilde{f}_{n-1}^{k_2})^2\}}\Big] \quad (15)$$

For a diagonally interpolated pixel, we assume that j on the interpolated pixel grid is the result of interpolating pixels $k_1$, $k_2$, $k_3$ and $k_4$ in the original pixel domain. The first moment can be computed exactly as:

$$E\{\tilde{f}_{n-1}^j\} = \frac{1}{4}[2 + E\{\tilde{f}_{n-1}^{k_1}\} + E\{\tilde{f}_{n-1}^{k_2}\} + E\{\tilde{f}_{n-1}^{k_3}\} + E\{\tilde{f}_{n-1}^{k_4}\}] \quad (16)$$

The accurate expression for the second moment is:

$$E\{(\tilde{f}_{n-1}^j)^2\} = \quad (17)$$

$$\frac{1}{16}\Big[4 + E\{(\tilde{f}_{n-1}^{k_1})^2\} + E\{(\tilde{f}_{n-1}^{k_2})^2\} + E\{(\tilde{f}_{n-1}^{k_3})^2\} + E\{(\tilde{f}_{n-1}^{k_4})^2\} + 4E\{\tilde{f}_{n-1}^{k_1}\} + 4E\{\tilde{f}_{n-1}^{k_2}\} + 4E\{\tilde{f}_{n-1}^{k_3}\} + 4E\{\tilde{f}_{n-1}^{k_4}\} + 2E\{\tilde{f}_{n-1}^{k_1}f_{n-1}^{k_2}\} + 2E\{\tilde{f}_{n-1}^{k_1}f_{n-1}^{k_3}\} + 2E\{\tilde{f}_{n-1}^{k_1}f_{n-1}^{k_4}\} + 2E\{\tilde{f}_{n-1}^{k_2}f_{n-1}^{k_3}\} + 2E\{\tilde{f}_{n-1}^{k_2}f_{n-1}^{k_4}\} + 2E\{\tilde{f}_{n-1}^{k_3}f_{n-1}^{k_4}\}\Big]$$

Applying the same approximation as with the horizontal/vertical case, we obtain:

$$E\{(\tilde{f}_{n-1}^j)^2\} \le \quad (18)$$

$$\frac{1}{16}\Big[4 + E\{(\tilde{f}_{n-1}^{k_1})^2\} + E\{(\tilde{f}_{n-1}^{k_2})^2\} + E\{(\tilde{f}_{n-1}^{k_3})^2\} + E\{(\tilde{f}_{n-1}^{k_4})^2\} + 4E\{\tilde{f}_{n-1}^{k_1}\} + 4E\{\tilde{f}_{n-1}^{k_2}\} + 4E\{\tilde{f}_{n-1}^{k_3}\} + 4E\{\tilde{f}_{n-1}^{k_4}\} + 2\sqrt{E\{(\tilde{f}_{n-1}^{k_1})^2\}E\{(\tilde{f}_{n-1}^{k_2})^2\}} + 2\sqrt{E\{(\tilde{f}_{n-1}^{k_1})^2\}E\{(\tilde{f}_{n-1}^{k_3})^2\}} + 2\sqrt{E\{(\tilde{f}_{n-1}^{k_1})^2\}E\{(\tilde{f}_{n-1}^{k_4})^2\}} + 2\sqrt{E\{(\tilde{f}_{n-1}^{k_2})^2\}E\{(\tilde{f}_{n-1}^{k_3})^2\}} + 2\sqrt{E\{(\tilde{f}_{n-1}^{k_2})^2\}E\{(\tilde{f}_{n-1}^{k_4})^2\}} + 2\sqrt{E\{(\tilde{f}_{n-1}^{k_3})^2\}E\{(\tilde{f}_{n-1}^{k_4})^2\}}\Big]$$

and we use this upper limit to approximate the second moment.

An embodiment of the invention is a modified H.263+ video codec. This has been tested in experiments. We modified an existing H.263+ video codec in two ways. In the case of single-frame (SF) motion compensation, we used the ROPE algorithm for mode switching decisions. The resulting bitstream is fully compliant with the H.263+ standard. Secondly, we modified the H.263+ codec to make use of one additional (long term) frame buffer. This frame buffer was periodically updated according to an update parameter N as in Fukuhara et al., cited above. For both the single frame and dual frame cases, we measured the performance for integer and half-pel motion vectors. The half-pel vectors are used and are modeled using the approximations given above.

Our experiments showed that the addition of the long term frame buffer improves the encoder's compression efficiency and renders the bitstream more robust to packet drops. However, for certain sequences the effect is small, and it depends on the update parameter N. A fixed N is not optimal for all sequences. Optimizations include choosing specific update parameters N for particular sequences.

A multiple frame coding embodiment of the invention is applied to rate switching networks. A long term or high quality reference frame may be used. Consider, for example, that wireless networks often experience significant transitions in network capacity. An example event that produces such a transition is a network handoff, while using services such as the Always Best Connected (ABC) approach. Dual frame encoding using a long term or high quality frame in this context can significantly improve the quality of frames transmitted immediately after the network handoff and smooth the abrupt and severe transition in network capacity.

Figure 2:
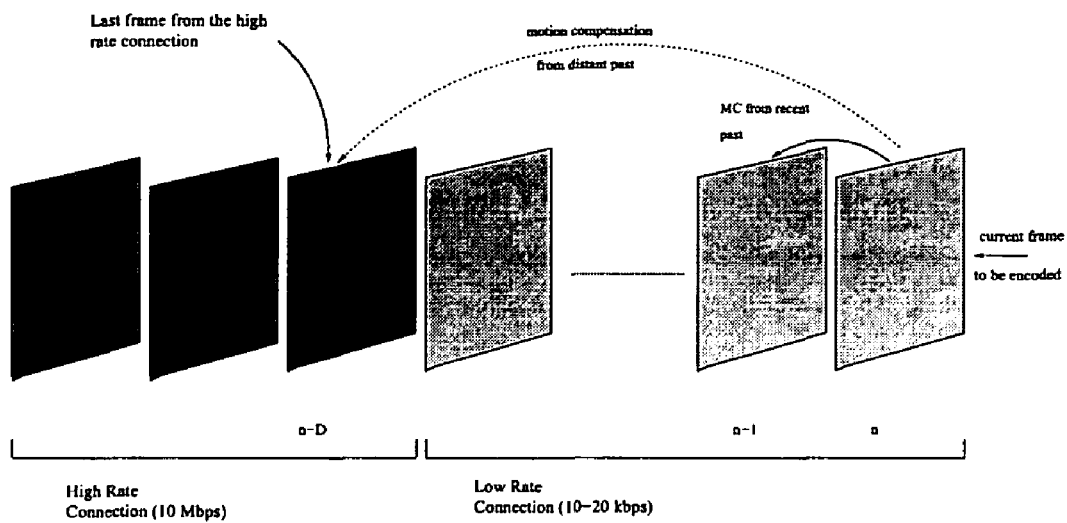
FIG. 2 is a schematic diagram illustrating an exemplary long term reference frame coding method of the invention in a rate-switching scenario.

In a preferred embodiment, a long term past frame is assigned to be the last frame coded just prior to the network switching from the high bandwidth to the low bandwidth mode. This is illustrated in FIG. 2, where a transition from 10 Mbps to a 10-20 kbps connection occurs. A current frame it is encoded with a long term frame n-D from the high rate connection. For each MacroBlock (MB) in a predictive frame, a search is conducted over both an immediate past frame and the long term past frame (or frames), and the better matching block is chosen.

We now consider a modified practical embodiment, applying the method of FIG. 2 to an ABC network operating under MPEG-4 coding. A video encoder operating under services like ABC must be robust to bandwidth changes of multiple orders of magnitude. We assume that the ABC network provides a timely delivery of packets with minimal loss. To counter the huge swings in bandwidth, we assume that the quantization parameter for each frame can be varied over its full range (1-31) as opposed to a standard compliant encoder, which restricts the change in the quantization parameter value to 25% of the previous value.

We simulated a multiple frame bandwidth switching embodiment by modifying a standard MPEG-4 coder. The MPEG-4 coder uses the rate control method described in A. Vetro, H. Sun, Y. Wang, "MPEG-4 Rate Control for Multiple Video Objects", IEEE Transactions on Circuits and Systems for Video Technology, Vol. 9, No. 1, pp. 186-99, February 1999. We considered each frame as a single object for the MPEG-4 encoder. We allocated additional memory for the long term frame. An extra bit is transmitted per inter-coded MB to inform the decoder which frame it referenced. The intra refresh period was set to 100. Lowering the intra refresh period enhanced the performance of the dual frame encoder. But frequent intra refresh results in higher bit rates which would exceed the bit rates available for a GPRS (General Packet Radio Service) system.

We tested different types of video sequences, with static and dynamic background, and scene changes. The format of the test sequences was QCIF (Quarter Common Interchange Format). The frame rate was 10 frames/second. To investigate the effects of switching to different low bandwidth networks, we simulated switching from 1 Mbps to low bandwidth networks ranging from 10 kbps (GPRS) to 150 kbps (1×RTT CDMA). We encoded various sequences using our dual frame buffer coder as well as with a conventional MPEG-4 coder for comparison. We found that retaining the high quality frame to be used as the long term past frame for the dual frame encoder results in better video quality for up to a few hundred frames after a switch to a lower bandwidth connection as quantified by the PSNR of the decoded sequence. The technique requires a small cost in memory (both at the encoder and decoder) to retain the dual reference frame, and a small cost in encoder complexity to search the second reference frame for the best match block.

In some instances, an impending switch of bandwidth may be anticipated, such as, by being forewarned or predicted. This provides an opportunity to encode a long term frame while at the higher bandwidth.

In another embodiment, a long term frame is taken periodically or occasionally (even when there is no change in bandwidth or channel/network conditions), and is allocated extra bandwidth to produce a high quality frame as the long term frame. This is a proactive approach to obtain a high quality long term reference frame occasionally or periodically, e.g., every N frames.

Extra bits are allocated to create the high quality reference frame so that it will have higher quality than the normal quality being encoded. This long term high quality reference frame can then serve as a source of high quality matching blocks for an extended period. In one example, the extended time period may exceed N frames if a change in condition occurs.

The allocation of extra bits can come from a scheduler. For example, we assume that there are multiple users utilizing the system resources which are allocated by a scheduler. The system we consider is a shared wireless medium like an HDR (high data rate) system which has rates of 400 kbps. Scheduler $S_1$ divides the available bandwidth B from the network equally among the k users. Each user has a bandwidth of B/k.

Scheduler $S_2$ reserves some portion b of the total bandwidth, and divides the remainder among all users. The reserved portion b will be allocated to each user in turn, cycling round-robin among the users. Each user has a bandwidth (B−b)/k during k−1 time slots, and has a bandwidth b+(B−b)/k during one time slot. FIGS. 3A and 3B represent the two schedulers, where the bandwidth is represented by the height and the horizontal axis is time. It is uniform for scheduler $S_1$ of FIG. 3A, but high for User i in FIG. 3B as the scheduler in $S_2$ provides additional bandwidth. This is shown by the thick black bar which represents extra bandwidth allocated for User i. This extra bandwidth is allocated to the other k−1 users in the system at different times. The average bandwidth over all users remains the same at any point of time. The extra periodic bandwidth allotted by $S_2$ is used for creating a high quality frame which is used as the long term frame in the multiple, e.g., dual, frame motion compensation scheme.

Another embodiment does not use a scheduler, but permits a user with fixed average bandwidth to use extra bits for one frame (with fewer bits for the frames before and after) if some amount of extra delay can be tolerated in the video. The extra bits for the frame simply translate into more time for the transmission of that frame. There may be a trade-off of compression performance and delay. In the scheduler embodiments, we may operate the scheduler so no extra delay is incurred for the high quality frame because extra bandwidth is periodically provided. However, we may constrain the total average bandwidth to be equal to the bandwidth of the evenly allocated $S_1$ system.

A specific embodiment modified MPEG-4 encoder has three modes of coding from which to choose: intra-coding, inter-coding using the short term reference frame, and inter-coding using the long term reference frame. For each macroblock (MB), we choose among them by first choosing between intra and inter-coding as follows. We compute the distortion $d_{min}$ between the best match MB in the short term or long term frame and the current MB to be coded. We compute the standard deviation 6 of the current MB. Intra coding is chosen if $\sigma < d_{min} - 512$, otherwise inter-coding is chosen. The choice between inter-coding from the short term and long term high quality frames is done on the basis of the distortion between the motion compensated MB and the current MB to be encoded The reference frame which yields a lower distortion is chosen.

Another embodiment involves the use of feedback from the decoder. As an example, the encoder can receive feedback from the decoder indicating an acknowledgement of received packets. Let i be the current frame's index. Using feedback with a fixed delay d, the encoder can have perfect knowledge of the decoder's (i−d)-th reconstructed frame. We will use the term re-decode to describe the encoder's process of using the feedback information to decode a past frame so that it is identical to the decoder's version of that frame. As the encoder knows which GOBs were received intact and which ones were dropped, it can simulate the decoder's operation exactly, including error concealment. A re-decoded frame is one at the encoder that is identical to the decoder version, whereas we use the term estimate to describe a frame at the encoder for which the feedback information is not yet available, so the encoder is forced to estimate the decoder version. With feedback information, estimates of pixel values in intermediate frames are still made using the above equations for intra, inter-ST, and inter-LT coded MBs. However, now the information about past decoder frames required by these equations can be reinitialized using the ACKed/NACKed re-decoded frames. Then the encoder can recalculate the pixel estimates much more reliably and track potential errors for the last d frames. The actual prediction residuals or intra coefficients are fed into the ROPE estimation algorithm where the reference frames are either ROPE estimates that also were calculated recursively, or re-decoded frames.

Figure 4:
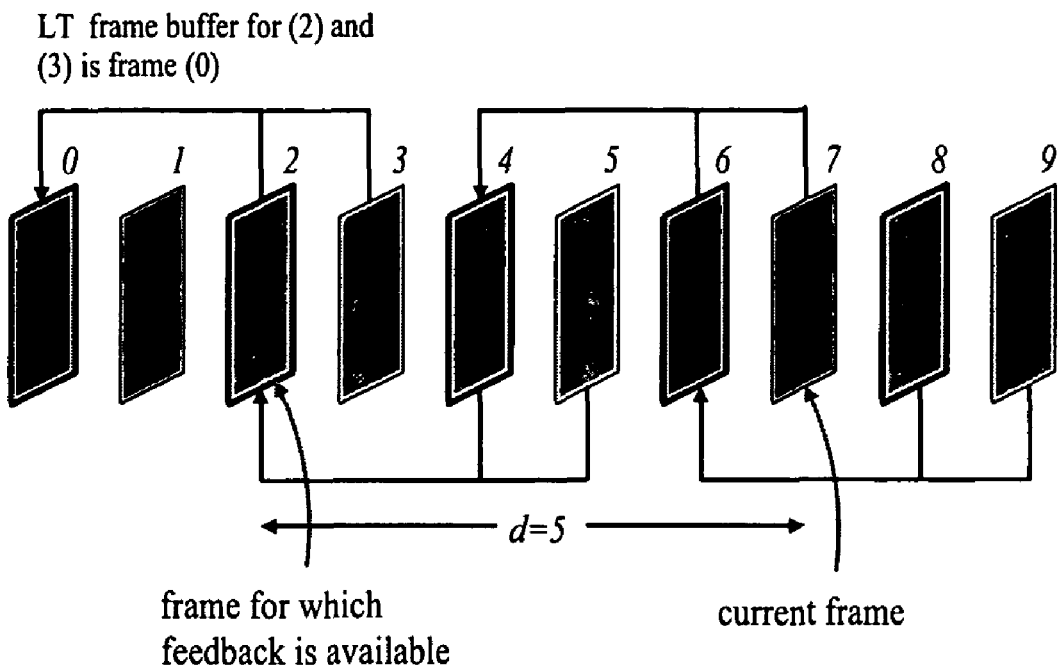
FIG. 4 schematically illustrates a long term reference frame encoding method with feedback in accordance with an embodiment of the invention.

An example is illustrated in FIG. 4. Here, the jump update parameter and the feedback delay are respectively N=2 and d=5. The jump update parameter N=2 means that frame 0 will be the long term reference for frames 2 and 3, frame 2 will be the long term reference for frames 4 and 5, and frame 4 will be used for frames 6 and 7.

Since d=5, at the start of encoding frame 7, frame 2 will be re-decoded, and this newly re-decoded frame can be promptly used to update the estimates of frames 3, 4, 5, and 6. For encoding frame 7, the long term frame is frame 4, and the short term one is frame 6, and the new estimates of these two frames will be used by the encoder to calculate the expected distortion due to packet drops for frame 7.

Figure 5:
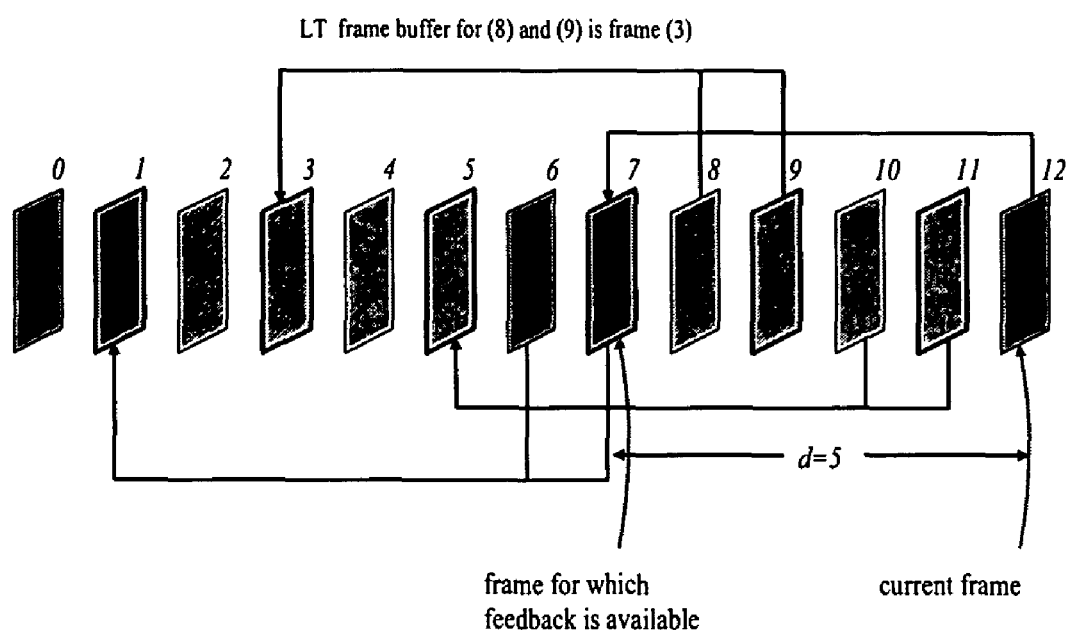
FIG. 5 schematically illustrates a long term reference frame encoding method with feedback in accordance with an embodiment of the invention.

An alternative approach is to make the long term frame buffer move forward to contain the closest exactly known frame that is the (i−d) frame. The feedback information improves the estimate of the ST frame, and reduces the estimation error for the LT frame to zero. We ensure that both the encoder and decoder long term frame buffers always contain an identical reconstruction. With a delay of d, we can use either a general (N, D) updating strategy with D=d and N>1, or a continuous updating strategy with D=d and N=1. An example for N=2 and d=5 is depicted in FIG. 5. In FIG. 5, frame 12 is currently being encoded. Its LT frame is frame 7 which has also been re-decoded. However, re-decoding frame 7 required the re-decoded versions of frames 1 and 6, its ST and LT frames, respectively. Now we can obtain the estimates of 8, 9, 10, and 11. For frame 8 the re-decoded 7 and the re-decoded 3 will be required. For 9 we will need estimated 8 (ST) and re-decoded 3 (LT). For 10 we will need estimated 9 and re-decoded 5. Similarly, 11 needs estimated 10 and re-decoded 5.

By synchronizing the long term frame buffers at the transmitter and receiver, we can totally eliminate drift errors caused by packet drop accumulation. Inter-LT encoded macroblocks, if they arrive, will be reconstructed in an identical manner at the encoder and decoder. Normally, this is only guaranteed by transmitting intra-coded macroblocks. Here, however, feedback signals enable us to use the long term frame buffer as an additional error robustness factor without sacrificing greatly in compression efficiency.

Instead of using feedback only to improve the distortion estimate and therefore the mode selection, we may now, in addition, use this information to re-decode the LT frame at the encoder and thus improve motion estimation, and use a more realistic reference frame. Experiments have shown this to perform very well under a variety of conditions.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A video encoder comprising:
   a coder for encoding vectors to describe at least an image block with respect to at least a reference block;
   a short term reference block buffer storing at least one short term reference block; and
   at least one long term reference block buffer storing at least one long term reference block;
   wherein the coder selectively chooses between encoding with respect to the at least one short term reference block in the short term reference block buffer and the at least one long term reference block in the long term reference buffer based upon one or more factors examined at the time of encoding to improve one of compression, video quality, and a metric balancing compression and video quality,
   wherein the at least one long term reference block buffer comprise a multiple frame buffer, and the encoder coder selectively chooses between coding using the reference block (INTER coding) and using INTRA coding, and
   wherein the coder chooses between two types of INTER coding and the INTRA coding, the two types of INTER coding comprising coding using the at least one short term long term reference block (ST) and the at least one long term long term reference block (LT), and wherein;
   the coder computes moments for the INTRA coding and the ST block using a recursive optimal per pixel estimate treating elements of a previous block as a random variable; and
   the coder computes moments for the LT block using a recursive optimal per pixel estimate treating elements of a previous block as a random variable.

2. The encoder of claim 1, wherein the coder for encoding selectively chooses the at least one long term reference block when a connection used by the video encoder changes to a lower quality.

3. The encoder of claim 1, wherein the coder for encoding selectively chooses the at least one long term reference block when a connection used by the video encoder is anticipated to be changing to a lower quality.

4. The encoder of claim 1, wherein the coder for encoding selectively chooses the at least one long term reference block to encode background data and selectively chooses a more recent reference block to encode foreground data.

5. The encoder of claim 1, wherein the coder conducts a fractional pixel accuracy encoding, by, determining, for the at least one long term reference block and on a fractional pixel grid,
   original pixel positions including pixels that coincide with an actual pixel position;
   horizontally or vertically interpolated pixel positions including pixels that lie between two original pixel positions; and
   diagonally interpolated pixel positions.

6. The encoder of claim 1, wherein:
   first moments of the horizontally or vertically interpolated pixel positions and the diagonally interpolated pixel positions are calculated directly; and
   second moments of the horizontally or vertically interpolated pixel positions and the diagonally interpolated pixel positions are estimated.

7. The encoder of claim 1, wherein the at least one long term reference block comprises a block in a region of interest.

8. The encoder of claim 1, wherein the at least one long term reference block comprises a composite frame predicted from both the short term frame memory and the long term frame memory.

9. The encoder of claim 1, wherein the at least one long term reference block comprises a long term reference frame and the coder encodes a frame on a block by block basis.

* * * * *

UNITED STATES PATENT AND TRADEMARK OFFICE
CERTIFICATE OF CORRECTION

| | | |
|---|---|---|
| PATENT NO. | : 8,040,949 B2 | |
| APPLICATION NO. | : 10/541732 | |
| DATED | : October 18, 2011 | |
| INVENTOR(S) | : Pamela Cosman et al. | |

It is certified that error appears in the above-identified patent and that said Letters Patent is hereby corrected as shown below:

In the Specification:

Col. 9, Line 62      Please delete " $f_n^{\;i}$ " and insert -- $f_n^i$ -- therefor.

Col. 9, Line 63      Please delete " $\hat{f}_n^{\;i}$ " and insert -- $\hat{f}_n^i$ -- therefor.

Col. 9, Line 65      Please delete " $\tilde{f}_n^{\;i}$ " and insert -- $\tilde{f}_n^i$ -- therefor.

Col. 9, Line 67 (Equation 1)

Please delete " $d_n^{\;i}=E\{(f_n^{\;i}-\tilde{f}_n^{\;i})^2\}=(f_n^{\;i})^2-2f_n^{\;i}E\{\tilde{f}_n^{\;i}\}+E\{(\tilde{f}_n^{\;i})^2\}$ ,, and insert -- $d_n^i = \mathrm{E}\left\{\left(f_n^i - \tilde{f}_n^i\right)^2\right\} = \left(f_n^i\right)^2 - 2f_n^i \mathrm{E}\left\{\tilde{f}_n^i\right\} + \mathrm{E}\left\{\left(\tilde{f}_n^i\right)^2\right\}$ -- therefor.

Col. 10, Line 1      Please delete " $d_n^{\;i}$ " and insert -- $d_n^i$ -- therefor.

Col. 10, Line 2      Please delete " $\tilde{f}_n^{\;i}$ " and insert -- $\tilde{f}_n^i$ -- therefor.

Col. 10, Line 7      Please delete " $\tilde{f}_n^{\;i}=\hat{f}_n^{\;i}$ " and insert -- $\tilde{f}_n^i = \hat{f}_n^i$ -- therefor.

Col. 10, Line 12      Please delete " $\tilde{f}_n^i = \tilde{f}_{n-1}^{\;k}$ " and insert -- $\tilde{f}_n^i = \tilde{f}_{n-1}^k$ -- therefor.

Col. 10, Line 13      Please delete " $\tilde{f}_n^i = \tilde{f}_{n-1}^{\;i}$ " and insert -- $\tilde{f}_n^i = \tilde{f}_{n-1}^i$ -- therefor.

Col. 10, Line 17 (Equation 2)

Please delete " $E\{\tilde{f}_n^i\} = (1-p)(\hat{f}_n^i) + p(1-p)E\left\{\tilde{f}_{n-1}^{\;k}\right\} + p^2 E\left\{\tilde{f}_{n-1}^{\;i}\right\}$ ,, and insert -- $E\{\tilde{f}_n^i\} = (1-p)(\hat{f}_n^i) + p(1-p)E\{\tilde{f}_{n-1}^k\} + p^2 E\{\tilde{f}_{n-1}^i\}$ -- therefor.

Signed and Sealed this
Sixth Day of March, 2012

David J. Kappos
*Director of the United States Patent and Trademark Office*

CERTIFICATE OF CORRECTION (continued)
U.S. Pat. No. 8,040,949 B2

In the Specification:

Col. 10, Line 20 (Equation 3)

Please delete "$E\{(\bar{f}_n^i)2\}=(1-p)(\hat{f}_n^i)^2+p(1-p)E\{(\bar{f}_{n-1}^k)^2\}+p^2E\{(\bar{f}_{n-1}^i)^2\}$"

and insert -- $E\{(\bar{f}_n^i)2\} = (1-p)(\hat{f}_n^i)^2 + p(1-p)E\{(\bar{f}_{n-1}^k)^2\} + p^2E\{(\bar{f}_{n-1}^i)^2\}$ -- therefor.

Col. 10, Line 25     Please delete "$\hat{f}_{n-1}^j$" and insert -- $\hat{f}_{n-1}^j$ -- therefor.

Col. 10, Line 25     Please delete "$e_n^i$" and insert -- $e_n^i$ -- therefor.

Col. 10, Line 26     Please delete "$\hat{e}_n^i$" and insert -- $\tilde{e}_n^i$ -- therefor.

Col. 10, Line 28 (Equation 4)

Please delete "$\hat{f}_n^i = \hat{f}_{n-1}^j + \hat{e}_n^i$"

and insert -- $\hat{f}_n^i = \hat{f}_{n-1}^j + \tilde{e}_n^i$ -- therefor.

Col. 10, Line 30     Please delete "$\hat{e}_n^i$" and insert -- $\tilde{e}_n^i$ -- therefor.

Col. 10, Line 31     Please delete "$\hat{e}_n^i$" and insert -- $\tilde{e}_n^i$ -- therefor.

Col. 10, Line 33     Please delete "$\tilde{f}_{n-1}^j$" and insert -- $\bar{f}_{n-1}^j$ -- therefor.

Col. 10, Line 34     Please delete "$\hat{f}_{n-1}^j$" and insert -- $\hat{f}_{n-1}^j$ -- therefor.

Col. 10, Line 36 (Equation 5)

Please delete "$\bar{f}_n^i = f_{n-1}^j + \hat{e}_n^i$"

and insert -- $\bar{f}_n^i = f_{n-1}^j + \tilde{e}_n^i$ -- therefor.

Col. 10, Line 39     Please delete "$\tilde{f}_{n-1}^j$" and insert -- $\bar{f}_{n-1}^j$ -- therefor.

Col. 10, Line 43     Please delete "$\tilde{f}_n^i$" and insert -- $\bar{f}_n^i$ -- therefor.

Col. 12, Line 13     Please delete "$\hat{f}_{n-m}^j$" and insert -- $\hat{f}_{n-m}^j$ -- therefor.

Col. 12, Line 14     Please delete "$e_n^i$" and insert -- $e_n^i$ -- therefor.

Col. 12, Line 15     Please delete "$\hat{e}_n^i$" and insert -- $\tilde{e}_n^i$ -- therefor.

In the Specification:

CERTIFICATE OF CORRECTION (continued)
U.S. Pat. No. 8,040,949 B2

Col. 12, Line 17 (Equation 9)

Please delete "$\tilde{f}_n^{\,i} = \hat{e}_n^{\,i} + \tilde{f}_{n-m}^{\,j}$"

and insert -- $\bar{f}_n^i = \hat{e}_n^i + \bar{f}_{n-m}^j$ -- therefor.

Col. 12, Line 18    Please delete "$\hat{f}_{n-m}^{\,j}$" and insert -- $\hat{f}_{n-m}^j$ -- therefor.

Col. 12, Line 18    Please delete "$\tilde{f}_{n-m}^{\,j}$" and insert -- $\bar{f}_{n-m}^j$ -- therefor.

Col. 12, Line 20 (Equation 10)

Please delete "$\hat{f}_n^{\,i} = \hat{e}_n^{\,i} + \hat{f}_{n-m}^{\,j}$"

and insert -- $\hat{f}_n^i = \hat{e}_n^i + \hat{f}_{n-m}^j$ -- therefor.

Col. 12, Line 25    Please delete "$\tilde{f}_n^{\,i}$" and insert -- $\bar{f}_n^i$ -- therefor.

Col. 12, Line 60    Please delete "$\hat{e}_n^{\,i}$" and insert -- $\hat{e}_n^i$ -- therefor.

Col. 12, Line 60    Please delete "$E\{\tilde{f}_{n-1}^{\,k}\}$" and insert -- $E\{\bar{f}_{n-1}^k\}$ -- therefor.

Col. 12, Line 61    Please delete "$E\{\tilde{f}_{n-1}^{\,i}\}$" and insert -- $E\{\bar{f}_{n-1}^i\}$ -- therefor.

Col. 12, Line 61    Please delete "$E\{(\tilde{f}_{n-1}^{\,k})^2\}$" and insert -- $E\{(\bar{f}_{n-1}^k)^2\}$ -- therefor.

Col. 12, Line 61    Please delete "$E\{(\tilde{f}_{n-1}^{\,i})^2\}$" and insert -- $E\{(\bar{f}_{n-1}^i)^2\}$ -- therefor.

Col. 12, Line 62    Please delete "$E\{\tilde{f}_{n-1}^{\,j}\}$" and insert -- $E\{\bar{f}_{n-1}^j\}$ -- therefor.

Col. 12, Line 62    Please delete "$E\{(\tilde{f}_{n-1}^{\,j})^2\}$" and insert -- $E\{(\bar{f}_{n-1}^j)^2\}$ -- therefor.

UNITED STATES PATENT AND TRADEMARK OFFICE
CERTIFICATE OF CORRECTION

| | | |
|---|---|---|
| PATENT NO. | : 8,040,949 B2 | Page 1 of 1 |
| APPLICATION NO. | : 10/541732 | |
| DATED | : October 18, 2011 | |
| INVENTOR(S) | : Cosman et al. | |

It is certified that error appears in the above-identified patent and that said Letters Patent is hereby corrected as shown below:

Column 1, lines 7-8, delete "filed Sep. 9, 2003" and insert -- filed Jan. 9, 2003 --.

Signed and Sealed this
First Day of May, 2012

David J. Kappos
*Director of the United States Patent and Trademark Office*